United States Patent Office 3,573,242
Patented Mar. 30, 1971

3,573,242
POLYMERIZATION PROCESS TO FORM POLYVINYL FLUORIDE IN EMULSION FORM
Lacey E. Scoggins, Bartlesville, Okla., assignor to Phillips Petroleum Company
No Drawing. Filed Dec. 20, 1968, Ser. No. 785,756
Int. Cl. C08f 3/22
U.S. Cl. 260—29.6
3 Claims

ABSTRACT OF THE DISCLOSURE

Process for emulsion polymerization of vinyl fluoride in which an oxidant and reductant are employed but the oxidant is introduced after the desired polymerization temperatures and pressures are attained.

---

This invention relates to polymerization of vinyl fluoride and more particularly to the polymerization of vinyl fluoride in emulsion form.

It is a principal object of this invention to provide an improved process for the polymerization of vinyl fluoride to form polyvinyl fluoride. Vinyl fluoride can be polymerized in an aqueous redox system by introducing substantially concurrently into a reactor vinyl fluoride, water, an oxidant and a reductant. In such processes, when polymerization occurs in the vinyl fluoride phase the polymer produced deposits on the reactor walls. This is, of course, very undesirable since it necessitates opening the reactor and scraping the polymer from the reactor walls.

According to the improved process of the present invention, vinyl fluoride is polymerized in an emulsion and the polyvinyl fluoride produced in emulsified form can be readily drained from the reactor. The emulsifiable polyvinyl fluoride polymer is particularly desirable for use in various commercial applications. Moreover, by the process of this invention polymerization is accomplished rapidly and the resulting polymer is generally produced in smaller particle size than are polymers produced by heretofore known aqueous redox polymerization processes.

The improved process of this invention is carried out by introducing into a closed reactor vinyl fluoride, water and a reductant. The temperature and pressure within the reactor are then adjusted to the levels desired for polymerization at which time an oxidant is introduced into the reactor. It is a critical feature of the present process that the temperature and pressure conditions within the reactor be substantially at the levels desired for polymerization prior to introduction into the reactor of the oxidant. If this sequence of operations is not followed, emulsion polymerization of the vinyl fluoride is not accomplished and the aforementioned advantages of the present process are not realized.

The applicable redox systems employed according to this invention are potassium persulfate and sodium bisulfite or ammonium persulfate and sodium sulfite. The persulfate serves as oxidant and the sulfite or bisulfite as reductant.

In the process the reductant and oxidant are each employed generally in amounts of from about 0.001 to 2 parts by weight per 100 parts by weight of the water employed, with the preferred range being from about 0.005 to 0.2. The amount of water employed is generally within the range of about 100 to 3000 parts by weight per 100 parts by weight of the vinyl fluoride monomer, with the preferred range being about 400 to 1200 parts. The polymerization temperature can vary considerably, but is usually within the range of about 20 to 100° C. and more preferably within the range of about 40 to 70° C. The reaction pressure is maintained within the range of about 100 to 5000 p.s.i.g. and preferably within the range of 400 to 2000 p.s.i.g. The reaction time is dependent in part on the polymerization temperature but normally reaction periods of about 5 minutes to 24 hours are sufficient.

The following Examples 1 and 2 illustrate preferred embodiments of the present invention.

EXAMPLE 1

Into a 250 milliliter agitated stainless steel reactor previously flushed with nitrogen were placed 0.15 gram of sodium bisulfite, 100 grams of vinyl fluoride, and 600 milliliters of water. The contents of the reactor were then heated to 53° C., after which 0.3 grams of potassium persulfate was washed into the reactor with 350 milliliters of water, resulting in a reactor pressure of 1850 p.s.i.g. and a reactor temperature only slightly less than 53° C. The mixture was then agitated at 53° C. for 1.25 hours, the pressure being maintained at 1850 p.s.i.g. by pumping in additional water as needed. The product was then readily exhausted from the reactor as a thick emulsion of polyvinyl fluoride. This emulsion expanded to a volume of approximately one gallon when the pressure was released. The polymer emulsion was then filtered and the polymer dried. Based on the weight of dry polymer the conversion of vinyl fluoride to polyvinyl fluoride was 47 percent. The melt flow number of the polypinyl fluoride was 6.5 square inches, as determined on a 1-gram sample pressed into a 1-inch disc which was then molded at 500° F. and 13,000 pounds of platen pressure for 2 minutes, the melt flow number being the square of the film diameter in inches. Film molded from the polymer had a tensile strength and an elongation of 6990 p.s.i. and 128 percent, respectively, as determined by the procedure of ASTM D 882–67.

EXAMPLE 2

Into a 1250-milliliter agitated stainless steel reactor previously flushed with nitrogen were placed 0.18 gram of sodium sulfite, 100 grams of vinyl fluoride, and 600 milliliters of water. The contents of the reactor were then heated to 52° C., after which 0.13 gram of ammonium persulfate was washed into the reactor with 382 milliliters of water, resulting in a reactor pressure of 1400 p.s.i.g. at a reactor temperature of only slightly less than 52° C. The mixture was then agitated at 52° C. for 4.0 hours, the pressure being maintained at 1400 p.s.i.g. by pumping in additional water as needed. The resulting product was readily exhausted from the reactor as a thick emulsion of polyvinyl fluoride, the emulsion expanding to a volume of approximately one gallon upon release of the pressure. The polymer emulsion was then filtered and the polymers dried. Based on the weight of dry polymer the conversion of vinyl fluoride to polyvinyl fluoride was 40 percent. The melt flow number of the polyvinyl fluoride was 7.5 square inches, determined as in Example 1 except that the platen pressure was applied for 45 seconds instead of 2 minutes.

EXAMPLE 3

This example illustrates the importance of introducing the oxidant into the reactor after the desired polymerization conditions are attained. Into a 1250-milliliter agitated stainless steel reactor previously flushed with nitrogen was charged 0.15 gram of sodium bisulfite, 0.3 gram of potassium persulfate, 100 grams of vinyl fluoride, and 976 milliliters of water. The mixture was then agitated at 51° C. for 1.42 hours, the pressure being maintained at 1850 p.s.i.g. by pumping in additional water as needed. No emulsion polymerization occurred; instead, polymerization took place in the monomer phase. There was extensive deposition of polymer on the walls of the reactor, which made necessary the use of mechanical scraping to remove the polymer from the reactor. The conversion of vinyl fluoride to polyvinyl fluoride was only 24 percent.

The polymer had a melt flow number of 6.9 square inches, as determined by the procedure used in Example 1.

Thus, the process of this example resulted in lower conversion of vinyl fluoride to polyvinyl fluoride than did the process of Example 1, as well as affording a polymer which, because it was not produced in the form of an emulsion, could not be removed from the reactor with ease.

These modifications and equivalents which fall within the spirit of the invention are to be considered a part thereof.

I claim:

1. A process for polymerizing vinyl fluoride to form polyvinyl fluoride in emulsion form which comprises introducing into a reactor vinyl fluoride, water and a reductant selected from sodium bisulfite and sodium sulfite, adjusting the temperature and pressure within said reactor to levels sufficient to cause polymerization of vinyl fluoride and then introducing into said reactor an oxidant which is potassium persulfate when said reductant is sodium bisulfite and is ammonium perslufate when said reductant is sodium sulfite, and recovering polyvinyl fluoride from said reactor.

2. A process according to claim 1, wherein the temperature within said reactor is within the range of about 20 to 100° C. and the pressure therein is within the range of 100 to 5000 p.s.i.g. before introduction of the oxidant.

3. A process according to claim 1, wherein the temperature within said reactor is within the range of about 40 to 70° C. and the pressure therein is within the range of 400 to 2000 p.s.i.g. before introduction of the oxidant.

References Cited

UNITED STATES PATENTS

| 3,255,164 | 6/1966 | Visger et al. | 260—85.5D |
| 3,448,073 | 6/1969 | McManimie | 260—85.5D |

HARRY WONG, Jr., Primary Examiner

U.S. Cl. X.R.

260—92.1